United States Patent
Cabrini et al.

(10) Patent No.: US 8,337,605 B2
(45) Date of Patent: Dec. 25, 2012

(54) CHEMICAL COATING COMPOUND FOR PROTECTING GLASSY SURFACES EXPOSED TO THE EXTERNAL ENVIRONMENT

(75) Inventors: Filippo Cabrini, Vicenza (IT); Fabrizio Caneva, Vicenza (IT); Francesco Franza, Padua (IT)

(73) Assignee: CIEFFE31 S.R.L., Padua (IT)

( * ) Notice: Subject to any disclaimer, the term of this patent is extended or adjusted under 35 U.S.C. 154(b) by 0 days.

(21) Appl. No.: 13/136,025

(22) Filed: Jul. 20, 2011

(65) Prior Publication Data

US 2012/0070643 A1 Mar. 22, 2012

(30) Foreign Application Priority Data

Jul. 22, 2010 (IT) ................. VI2010A0203

(51) Int. Cl.
*C09K 3/00* (2006.01)
*C09K 3/18* (2006.01)
(52) U.S. Cl. .............. 106/2; 106/287.1; 106/287.13; 106/287.14; 106/287.34; 106/311
(58) Field of Classification Search ........... 106/287.1, 106/287.13, 287.14, 287.34, 311, 2
See application file for complete search history.

(56) References Cited

U.S. PATENT DOCUMENTS

| | | | | |
|---|---|---|---|---|
| 6,924,039 B2 * | 8/2005 | Ochiai | ........................ | 428/450 |
| 7,332,213 B2 * | 2/2008 | Mimura et al. | ............... | 428/212 |
| 7,557,149 B2 * | 7/2009 | Tomonari | ...................... | 523/137 |
| 7,578,877 B2 * | 8/2009 | Giessler et al. | ........... | 106/287.13 |
| 7,897,675 B2 * | 3/2011 | Tomonari | ...................... | 524/439 |
| 7,902,292 B2 * | 3/2011 | Tomonari | ...................... | 524/779 |
| 2011/0061568 A1 * | 3/2011 | Fiedler et al. | ............. | 106/287.13 |

FOREIGN PATENT DOCUMENTS

| | | | |
|---|---|---|---|
| EP | 1634933 A1 * | 3/2006 | |
| JP | 2006098444 A * | 4/2006 | |
| WO | WO2006049935 A1 * | 5/2006 | |
| WO | WO2009074570 A1 * | 6/2009 | |

* cited by examiner

*Primary Examiner* — Anthony J Green
(74) *Attorney, Agent, or Firm* — Hedman & Costigan, P.C.; James V. Costigan

(57) ABSTRACT

A chemical composition for protecting glassy surfaces exposed to the external environment comprising silicon dioxide, in a percentage between about 0.3-2%, isopropyl alcohol (2-propanol) in percentage between 60-70%, 1-methoxy-2-propanol in percentage between 15-25%, ethanol in percentage between 0.5-3.5% and ethyl silicate in percentage between 0.1-1%.

10 Claims, No Drawings

CHEMICAL COATING COMPOUND FOR PROTECTING GLASSY SURFACES EXPOSED TO THE EXTERNAL ENVIRONMENT

The present invention relates to the field of nanotechnology and concerns a chemical coating composition for protecting glassy surfaces exposed to the external environment.

The present invention also concerns the use of such a chemical coating composition for the formation of a transparent and invisible film (or patina), suitable for protecting glassy surfaces exposed to the external environment, for example windows of buildings, solar panels, photovoltaic panels and wind paddles to which the transparent film is firmly coupled.

A document published as WO2009/074570 relates to a method for creating a break-resistant coating of a paint based on an alkyl silicate by applying compositions presented and described in said document to a purely metallic surface.

A document published as WO2006/049935 refers, on the other hand, to a self-binding coating composition for the production of solid cores of electrical steel sheets to be used in electrical equipment.

Finally, a document published as JP2006098444 is concerned with an antireflection and scratch-resistant laminate sheet, obtained by applying, in sequence, a scratch-resistant layer and an antireflection layer to the surface of a transparent substrate.

As is known, moreover, in the field of chemical products, a silicon-based chemical composition has been recently developed, which can be advantageously used for covering and consequently protecting glassy surfaces such as typically the glass of cars.

The chemical coating composition in question is the object of the European patent application published as EP 1634933. Such a chemical coating composition, when uniformly applied to the glass of the car, forms a transparent, invisible and very thin film that, by virtue of its chemical formulation, favours disposal and slipping of gnats, birds casts, impurities or dust of any nature or kind, thereby preventing them from firmly and lastingly sticking to the glass which keeps the glass clean.

The aforesaid transparent film is undoubtedly extremely effective for the function just described, when coupled with the glassy surface installed on the car body.

However, for such a chemical coating composition or transparent film formed thereof, some recognized drawbacks still persist that are mainly related to the long time required for the chemical coating composition, lying on the outer face of the glassy surface, to dry and harden in order to become the transparent film. Another drawback of the chemical composition of the prior art here considered is due to the fact that the drying and hardening of such a composition, on a glassy base surface, must necessarily be performed in an industrial drying oven.

This leads to an inevitable and, though limited undesirable power consumption, that is directly proportional to the set speed of drying.

The present invention seeks to overcome the drawbacks of the current state of the art described above.

More specifically, a primary purpose of the present invention is to provide a chemical coating composition which, when applied to cover the face of a glassy surface exposed to the external environment, requires a shorter drying and hardening time which is almost immediate and in any case shorter than known equivalent chemical compositions.

It is a second purpose of the invention to devise a chemical coating composition for glassy surfaces exposed to the external environment which solidifies quickly and, in addition, in a nearly spontaneous way, without the need to be introduced into an industrial drying oven that is used for similar compositions that are commercially available.

It is an object of the invention to reduce the consumption of energy that is incurred in order to effectively apply a transparent coating film to a generic glassy surface for the purpose of making the surface repellent to any kind of impurity that comes in contact with it.

It is an object of the present invention to simplify in respect of the prior art the activities that a manufacturer must implement in order to coat a glassy surface, whose face to be exposed to the external environment, with a transparent protective film, that is definitely and really repellent to any kind of impurity that comes into contact with it.

Said purposes are achieved through a chemical coating composition for protecting glassy surfaces exposed to the external environment where said chemical coating composition comprises silicon dioxide, in a percentage between about 0.3-2% includes the following chemical components:

- isopropyl alcohol (2-propanol) in percentage between 60-70% approximately;
- 1-methoxy-2-propanol in percentage between 15-25% approximately;
- ethanol in percentage between 0.5-3.5% approximately;
- ethyl silicate in percentage between 0.1-1%.

An object of the present invention is the use of said chemical coating composition as transparent protective film smeared on glassy surfaces exposed to the external environment, such as windows of buildings, solar panels, photovoltaic panels and wind paddles.

Advantageously, thanks to its particular formulation, when the chemical coating composition which is the object of the invention is applied to uniformly cover the face of the glassy surface that is exposed to the external environment, the chemical coating composition dries and hardens almost instantly and in any case more rapidly than known similar chemical compositions.

Still advantageously, when the chemical coating composition of the invention is applied to the glassy base surface, it forms a transparent film that completely solidifies in the a short time in an almost spontaneous manner, without requiring that the formed assembly must be introduced together into an industrial drying oven. Equally advantageously, this limits the consumption of the energy that is required to effectively apply to a generic glassy surface, a transparent film that is produced by the drying of a chemical coating composition on a glassy surface itself in order to make the glassy surface repellent to any kind of impurity (gnats, birds casts, dusts and the like).

Furthermore, the invention makes it easier to effectively make a glassy surface repellent to any kind of impurity that comes into contact with it as compared to the prior art.

Further features of the invention will appear to a greater extent from the description that follows, which provides an illustrative and preferred, but non-limiting embodiment of the chemical coating composition of the invention.

Such a chemical coating composition comprises silicon dioxide (or silica, $SiO_2$ as raw or molecular formula) in percentage between about 0.3-2% and generally in the amorphous state.

In accordance with the invention, the chemical composition also includes the following chemical components:

- isopropyl alcohol (2-propanol, $C_3H_8O$ as raw or molecular formula, structural isomer of the propanol) in a percentage between about 60-70%;

1-methoxy-2-propanol ($C_4H_{10}O_2$ as raw or molecular formula) in a percentage between about 15-25%;
ethanol ($C_2H_5OH$ as raw or molecular formula) in percentage between 0.5-3.5%;
ethyl silicate ($Si(OC_2H)_4$ as raw or molecular formula) in a percentage between 0.1-1%.

Preferably, the percentage of ethyl silicate $Si(OC_2H_5)_4$ is 0.4%.

The chemical coating composition described herewith also presents the following physicochemical properties:
open tank flash point equal to 15.5° C.;
melting point equal to −90° C.;
boiling point equal to 82.5° C.
evaporation ratio (understood as ratio between the evaporation temperature of a given material and that one of a specific reference material) equal to 2.88;
specific density (or relative, understood as ratio between the density of a given substance and that one of a specific reference substance) equal to 0.8 at room temperature;
vapour pressure (air=1) equal to 4.4 KPa at a temperature of 20° C.;
relative vapour density equal to 2.1 at a temperature of 15° C.

In particular, the ratio of evaporation is useful for assessing the health risks and fire danger of a material.

The chemical coating composition object of the present invention is substantially colorless and transparent and presents an odour that is characteristic of alcohol. Furthermore, such a chemical composition presents a viscosity between about 50-100 KU (KREBS Unit) at a temperature of 20° C., measured according to the ASTM D562 method through a Stromer viscometer.

The present invention also includes the use of the chemical coating composition previously described as a transparent protective film, that is applied to glassy surfaces exposed to the external environment, such as windows of buildings, solar panels, photovoltaic panels and wind paddles.

More specifically, the transparent protective film is formed by drying and hardening the chemical coating composition that has been kept in the liquid state. From such a state, the chemical composition is applied:
on existing surfaces, already installed, through spray guns with nozzle of 1.0/1.2, with a dehumidifier in air line with a manometer in order to standardize the air pressure to 5 atmospheres; or
in line, directly during the manufacturing of the glassy surfaces with an industrial spray system, at any time before packaging the material with the glassy surface.

The chemical coating composition of the invention, when in the liquid state, has a very fast drying time—equal to 120 minutes at 10° C., 60 minutes at 20° C. and 30 minutes at 30° C.—which makes the chemical composition itself extremely advantageous and effective compared to equivalent known compositions.

Indeed, the chemical composition of the invention, thanks to its special formulation, aggregates and reticulates immediately and automatically cloggs up the pores thereof, when applied to the quartz which typically constitutes the glassy surface to which the chemical composition is applied.

The piece made from the simple aggregation of the aforesaid transparent film to the pre-existing glassy surface, is a finished product, ready to be mounted, after a reduced time interval and not a semi-finished product which, must be introduced into a drying oven, in order to be formed into a final product.

Such an objective is achieved without affecting the capability of the transparent film to prevent any kind of impurity, such as dust of various kinds, gnats, birds casts and the like, from becoming attached to the transparent film.

The transparent film obtained by drying and hardening the chemical coating composition of the invention is also resistant to UV-A and UV-B ultraviolet radiation, in particular with respect to the UV-A radiation it contributes to the shielding in the range between 280 and 400 nm (nanometers), therefore providing effective against the yellowing and opacification processes of the glassy surface.

Preferably but not necessarily, the transparent film has a thickness of 0.8 mμ (micrometers).

The application of the chemical coating composition on glassy surfaces exposed to the external environment, such as windows of buildings, solar panels, photovoltaic panels and wind paddles, results in a finished product with a guarantee of 10 years.

The chemical coating composition of the invention is used for the purpose of keeping the glassy surfaces clean, by avoiding the adhesion of substances that dirty the glassy surfaces.

The avoidance of the adhesion of substances to the treated glassy surfaces is due to the filling of the interstices present at a nonometric level in the glassy surface to be treated.

Indeed, by closing these interstices, extraneous elements, such as dust, sand, atmospheric particles, pollen and even more, fail to adhere to the treated surface in a stable manner and, consequently, the extraneous elements do not remain settled on the treated surface.

Even if the soiling elements settle on the treated surface, the simple action of atmospheric agents such as wind or rain would be able to effectively remove them.

In addition and at the same time, the chemical coating composition here claimed involves greater transparency (or reduction of the surface reflection) in case of building applications (windows, lamps and so on), and a higher transmittance in case of applications in solar photovoltaic applications, in a direct thermal field or by means of mirrors.

The chemical coating composition of the invention limits the amount of light reflected by the glassy surface, thus allowing full use of the incident beam.

As a result positive effects arise which can be really found and measured, such as in the photovoltaic field, where the power of the module is normally increased by the composition of the invention from a minimum of 1% to a maximum of 2.5%.

In light of the foregoing, the chemical coating composition of the invention, when used in the solid state, forms a transparent film on the glassy surface to which is applied ensuring the maintenance of high cleanliness levels for longer times and consequently an increase in the transmittance due to the molecular arrangement of the silicon which is reflected in cost savings where the incurred costs are reduced by approximately 60% because of significant energy savings.

On the basis of the foregoing, it is, therefore, understood that the chemical coating composition for protecting glassy surfaces exposed to the external environment, achieves the purpose and reaches the advantages mentioned above. It is, then, clear that many other variations can be made to the chemical coating composition in question, without departing from the novelty intrinsic in the inventive idea expressed here, as it is clear that, in the practical implementation of the invention, materials can be changed, as needed, and replaced with others technically equivalent.

The invention claimed is:
1. Coating chemical composition for protecting glassy surfaces exposed to the external environment comprising silicon dioxide, in percentage between about 0.3-2% wherein said composition includes the following chemical components:

isopropyl alcohol (2-propanol) in a percentage between 60-70%;
1-methoxy-2-propanol in percentage between 15-25%;
ethanol in percentage between 0.5-3.5%;
ethyl silicate in percentage between 0.1-1%.

2. Chemical composition as defined in claim 1 wherein said composition has a flash point in open vessel equal to 15.5° C.

3. Chemical composition as in claim 1 wherein said composition has a melting point equal to −90° C.

4. Chemical composition as defined in claim 1 wherein said composition has a boiling point equal to 82.5° C.

5. Chemical composition as defined in claim 1 wherein said composition has an evaporation ratio equal to 2.88.

6. Chemical composition as defined in claim 1 wherein said composition has a specific (or relative) gravity equal to 0.8 at room temperature.

7. Chemical composition as defined in claim 1 wherein said composition has a vapour pressure equal to 4.4 KPa at a temperature of 20° C. and a vapour density equal to 2.1 at a temperature of 15° C.

8. Chemical composition as defined in claim 1 wherein said composition has a characteristic alcohol odour.

9. Chemical composition as defined in claim 1 wherein said composition has a viscosity of between 50-100 KU (KREBS Unit) at a temperature of 20° C., measured by the ASTM D562 method by means of a Stromer viscometer.

10. Chemical composition as defined in claim 1 wherein said composition has a drying time of 120 minutes at 10° C., 60 minutes at 20° C. and 30 minutes at 30° C.

\* \* \* \* \*